United States Patent Office 2,726,477
Patented Dec. 13, 1955

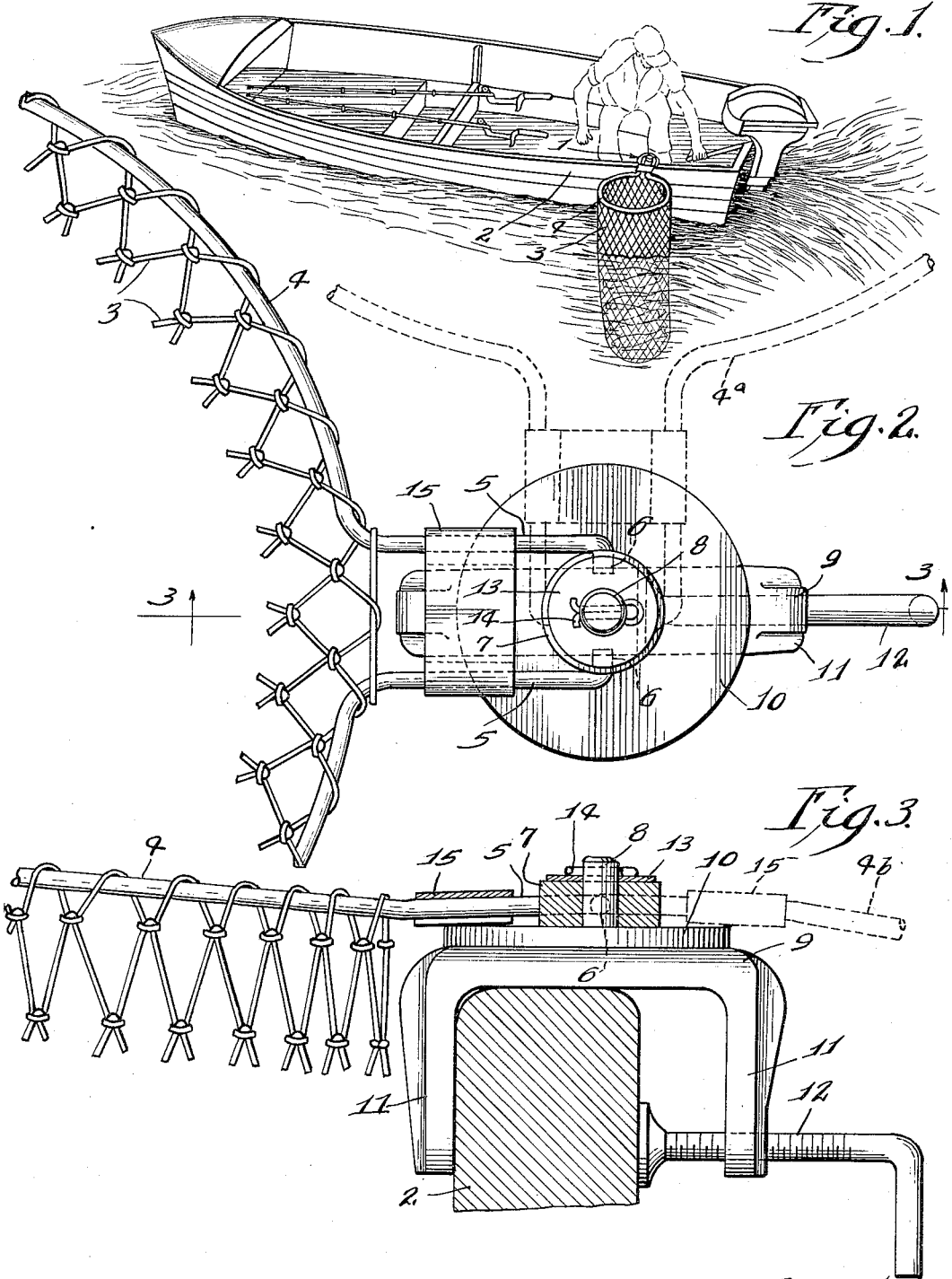

2,726,477
FISH BAG

Roy L. Firkins, Streator, Ill.

Application January 21, 1954, Serial No. 405,325

3 Claims. (Cl. 43—55)

This invention relates to a fish bag, that is to say to a bag provided with means for attaching the same to a boat in a manner to suspend the bag in the water for temporarily holding and preserving fish.

The main objects of the invention are to provide a fish bag with means for mounting the same on a boat in such a manner that the bag may be readily removed from the water and swung into the boat without detaching the bag from the boat; to provide a mounting for the bag whereby it may automatically swing horizontally alongside the boat so as to yield to objects such as tree stumps, piles, or other objects often found in good fishing grounds; to provide a bag mounting which will be easily attachable to and detachable from a boat; to provide a fish bag structure of the character indicated in which the mouth of the bag is effectively held open to facilitate the deposit of fish in the bag; to provide a fish bag structure of the character indicated which is strong and durable, but which may be manufactured at low cost; and in general it is the object of the invention to provide an improved fish bag structure of the character indicated.

Other objects and advantages of the invention will be understood by reference to the following specification and accompanying drawing wherein there is illustrated a fish bag structure embodying a selected form of the invention.

In the drawing:

Fig. 1 is a perspective illustration showing the general character and application of the improved fish bag structure.

Fig. 2 is a plan view of the improved structures; and

Fig. 3 is a section on the line 3—3 of Fig. 2.

The fish bag structure is designed for attachment as indicated at 1 to a side portion 2 of a boat in such a manner that the bag proper 3 will be suspended along side the boat in the water. The bag 3 may be of any suitable construction such as a suitable cord constructed net suspended from a fairly rigid metal ring 4.

The bag 3 is suspended from a metal ring 4 which may be formed of stout metal wire of the order of 3/16 of an inch in diameter and the ring may be of the order of 10 inches in diameter, these dimensions being merely typical and not essential or critical. The ring is formed with a pair of laterally extending arms 5, 5 which are parallel to each other and which are provided with substantially coaxially inturned end portions 6, 6. The inturned end portions 6, 6 are inserted into suitable holes provided in a collar 7 which is rotatably mounted on an axially vertical pivot pin 8 which extends upwardly from a mounting member 9. The mounting member 9 comprises a disc part 10 formed integral with an underlying or depending C-clamp structure comprising depending arms 11, 11, one of the latter carrying a clamp screw 12 by means of which the mounting member may be fastened to the boat side 2 to position the disc 10 in a substantially horizontal plane. The collar 7 is held against displacement from the pivot pin 8 by means of an overlying washer 13 and a cotter pin 14 which passes through the upper end of the pivot pin.

The collar is freely rotatable about the pivot pin 8 and the bag supporting ring 4 is freely movable about the pivot axis of the pivot ends 6 of the ring arms 5. Hence, it will be seen that the fish bag is capable of unrestricted horizontal rotation about the pivot 8, and also rotation through an arc of substantially 180° about the horizontal axis of the arm pivots 6.

The arms 5 are held together by means of a suitable clip 15 to prevent separation of said arms and removal of the pivot ends 6 thereof from the collar 7. The various metal parts are preferably formed of metal which resists corrosion or which is suitably treated or coated to prevent corrosion.

In Fig. 2 there is illustrated in broken lines 4a one horizontally adjusted position of the ring 4a, this position representing a shift of about 90° about the axis of the pivot pin 8 from the position shown in full lines. In Fig. 3 there is illustrated in broken lines at 4b a changed position of the ring 4 in which it has been rotated through an arc of about 180° about the axis of the pivot pins 6. This position 4b represents the position to which the ring 4 would be adjusted when it is desired to shift the bag 3 into the boat to facilitate movement of the boat from one location to another. As indicated in Fig. 3, portions of the clip 15 which embrace the arms 5, 5 are engageable with the top of the disc part 10 of the clamp structure to cooperate with the pivots 6 to support the ring 4 in generally horizontal position. It is preferred that the arms 5 extend at a slight angle to the plane of the ring 4 so that in the normal position, the ring 4 will extend outwardly and slightly upwardly from a horizontal plane as best illustrated in Fig. 3. This facilitates the introduction of fish into the bag and it also compensates for possible downward flexing of the ring when the bag is heavily loaded with fish.

When the bag is mounted on a boat through the agency of the universal joint structure described, the bag is freely shiftable or displaceable from the normal outwardly extending position represented in Fig. 1 to a rearwardly offset position closer to the side of the boat, such offsetting being adapted to be effected manually to cause the fish bag structure to clear objects close to the path of movement of the boat. Such offsetting may also be effected automatically as an incident to engagement of the fish bag or its supporting ring with an object which is too close to the path of the boat to permit the ring to pass the object without engaging the same. When it is desired to effect rapid movement of the boat from one location to another, the bag may be gathered together immediately under the supporting ring 4 to, in effect, close the bag and the ring and the bag then pulled inwardly of the boat by pivotal movement about the axis of the pivots 6 to the position represented at 4b in Fig. 3. The described swivel mounting of the bag structure avoids the necessity for removing the net and remounting it at each change of fishing location and it prevents breakage or other damage should the bag structure accidentally come in contact with a part of a dock, stumps, small willows or other trees, or other objects often found in good fishing grounds.

Various changes in the described construction may be made while retaining the principles of the invention.

I claim:

1. A fish bag and support assembly comprising a clamp which is adapted for attachment to a boat side, said clamp having a normally horizontal stationary disc and a pivot pin extending upwardly from said disc, a bag, a bag support for holding the mouth of said bag open and for suspending said bag alongside the boat, and a collar rotatably mounted on said pivot pin and supported by said disc, said bag support including means extending from a portion thereof and axially horizontally pivotally mounted on said collar, said bag and bag support being thereby rotatable about both horizontal and vertical axes to permit said bag and bag support to be readily swung into the boat and also shifted alongside the boat to yield to obstacles encountered when the boat it under movement.

2. A fish bag and support assembly comprising a clamp which is adapted for attachment to a boat side, said clamp having a normally horizontal stationary disc and a pivot pin extending upwardly from said disc, a bag, a bag supporting ring for holding the mouth of said bag open and for suspending said bag alongside the boat, a collar rotatably mounted on said pivot pin and supported by said disc, and means locking said collar against upwardly displacement from said pivot pin, said ring being provided with a pair of arms which extend laterally from the ring, and are provided with horizontal means pivotally mounting said arms on said collar, said arms having thereon means engageable with said disc to cooperate with said pivot mounting on said arms to support said ring in generally horizontal position to suspend said bag as aforesaid.

3. A fish bag and support assembly comprising a clamp which is adapted for attachment to a boat side, said clamp having a normally horizontal stationary disc and a pivot pin extending upwardly from said disc, a bag, a bag supporting ring for holding the mouth of said bag open and for suspending said bag alongside the boat, a collar rotatably mounted on said pivot pin and supported by said disc, means locking said collar against upward displacement from said pivot pin, said ring being provided with a pair of arms which extend laterally from the ring and are provided with end portions which extend toward each other in substantially coaxial relationship, said end portions being vertically rotatably mounted in said collar, and a clip interconnecting said arms to prevent spreading of said arms and disengagement of said end portions from said collar, said clip being engageable with said disc to co-operate with said pivotally mounted end portions to support said ring in generally horizontal position to suspend said bag as aforesaid.

References Cited in the file of this patent

UNITED STATES PATENTS

| | | |
|---|---|---|
| 373,199 | Schedin | Nov. 15, 1887 |
| 392,901 | Barnes | Nov. 13, 1888 |
| 1,478,921 | Slater | Dec. 25, 1923 |
| 1,532,367 | Bockman | Apr. 7, 1925 |
| 1,930,673 | Consolazio | Oct. 17, 1933 |